(12) United States Patent
Mcsweeney et al.

(10) Patent No.: US 11,822,828 B1
(45) Date of Patent: Nov. 21, 2023

(54) AUTOMATIC TAGGING OF STORAGE OBJECTS WITH ASSOCIATED APPLICATION NAMES

(71) Applicant: DELL PRODUCTS L.P., Hopkinton, MA (US)

(72) Inventors: Paul Mcsweeney, Silversprings (IE); Andrew O'Shaughnessy, Endersby (IE); Colm O'Leary, Ovens (IE)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 17/944,262

(22) Filed: Sep. 14, 2022

(51) Int. Cl.
*G06F 3/06* (2006.01)

(52) U.S. Cl.
CPC ............ *G06F 3/067* (2013.01); *G06F 3/0604* (2013.01); *G06F 3/0661* (2013.01)

(58) Field of Classification Search
CPC ....... G06F 3/0604; G06F 3/0661; G06F 3/067
See application file for complete search history.

(56) References Cited

U.S. PATENT DOCUMENTS

| | | | |
|---|---|---|---|
| 2005/0232210 A1* | 10/2005 | Karaoguz | H04N 21/21825 348/E7.071 |
| 2011/0283290 A1* | 11/2011 | Thunquest | G06Q 10/06 711/E12.001 |
| 2016/0070652 A1* | 3/2016 | Sundararaman | G06F 3/0665 711/154 |
| 2020/0074732 A1* | 3/2020 | Alam | G06F 16/9535 |

* cited by examiner

*Primary Examiner* — Gil H. Lee
(74) *Attorney, Agent, or Firm* — Anderson Gorecki LLP

(57) ABSTRACT

Storage objects are mapped to host applications in a storage domain. Each of the storage objects is analyzed to determine importance in terms of predetermined criteria such as quality of service of the storage object, replication level of the storage object, size of the storage object, input-output loading of the storage object, and input-output loading of a host application that uses the storage object. Storage objects that satisfy predetermined importance characteristics are automatically tagged with the name of the host application that uses the storage object. The storage objects may also be tagged with the names of data structures that satisfy predetermined importance characteristics. Storage groups, masking views, and volume devices may also be tagged.

9 Claims, 6 Drawing Sheets

| WWN | Type | Capacity | Utilization | Status | Tag |
|---|---|---|---|---|---|
| 0001 | TDEV | 1 TB | 25% | Ready | Oracle DB, Exchange |
| 0002 | TDEV | 0.5 TB | 55% | Ready | Oracle DB, Payroll |
| 0003 | TDEV | 2 TB | 80% | Ready | Multisim |

| WWN | Type | Capacity | Utilization | Status | Tag |
|---|---|---|---|---|---|
| 0001 | TDEV | 1 TB | 25% | Ready | Oracle DB, Exchange |
| 0002 | TDEV | 0.5 TB | 55% | Ready | Oracle DB, Payroll |
| 0003 | TDEV | 2 TB | 80% | Ready | Multisim |

AUTOMATIC TAGGING OF STORAGE OBJECTS WITH ASSOCIATED APPLICATION NAMES

TECHNICAL FIELD

The subject matter of this disclosure is generally related to data storage management.

BACKGROUND

Data storage systems such as Storage Area Networks (SANs) and Network-Attached Storage (NAS) can be used to maintain large production storage objects that are used by instances of host applications running on host servers to perform a variety of organizational functions. Examples of host applications may include, but are not limited to, software for email, accounting, manufacturing, inventory control, and a wide variety of other organizational processes. One or more production storage objects are created for use by instances of each host application. The storage capacity of the managed drives is abstracted by multiple layers of storage objects between the managed drives and the production storage objects. Moreover, storage capacity may be shared by multiple host applications, so there may be multiple sets of storage objects in different storage groups. Such complexity makes it difficult for an administrator to determine where the most important data is stored.

SUMMARY

All examples, aspects and features mentioned in this document can be combined in any technically possible way.

In accordance with some implementations, a method comprises: identifying storage objects within a storage domain; automatically selecting ones of the storage objects that satisfy predetermined importance characteristics; and automatically tagging the selected storage objects.

In accordance with some implementations, an apparatus comprises: a storage management computer configured to communicate with a storage node to: identify storage objects within a storage domain; automatically select ones of the storage objects that satisfy predetermined importance characteristics; and automatically tag the selected storage objects.

In accordance with some implementations, a non-transitory computer-readable storage medium stores instructions that when executed by one or more computers cause the computers to perform a method comprising: identifying storage objects within a storage domain; automatically selecting ones of the storage objects that satisfy predetermined importance characteristics; and automatically tagging the selected storage objects.

BRIEF DESCRIPTION OF THE FIGURES

FIG. 4 illustrates examples of storage object tags.

DETAILED DESCRIPTION

Some aspects, features, and implementations described herein may include computer devices, components, and computer-implemented steps or processes. It will be apparent to those of ordinary skill in the art that the computer-implemented steps or processes may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, process, or element is necessarily described herein as part of a computer system. Those of ordinary skill in the art will recognize steps, processes, and elements that may have a corresponding computer system or software component. Such computer system and software components are therefore enabled by describing their corresponding steps, processes, or elements, and are within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
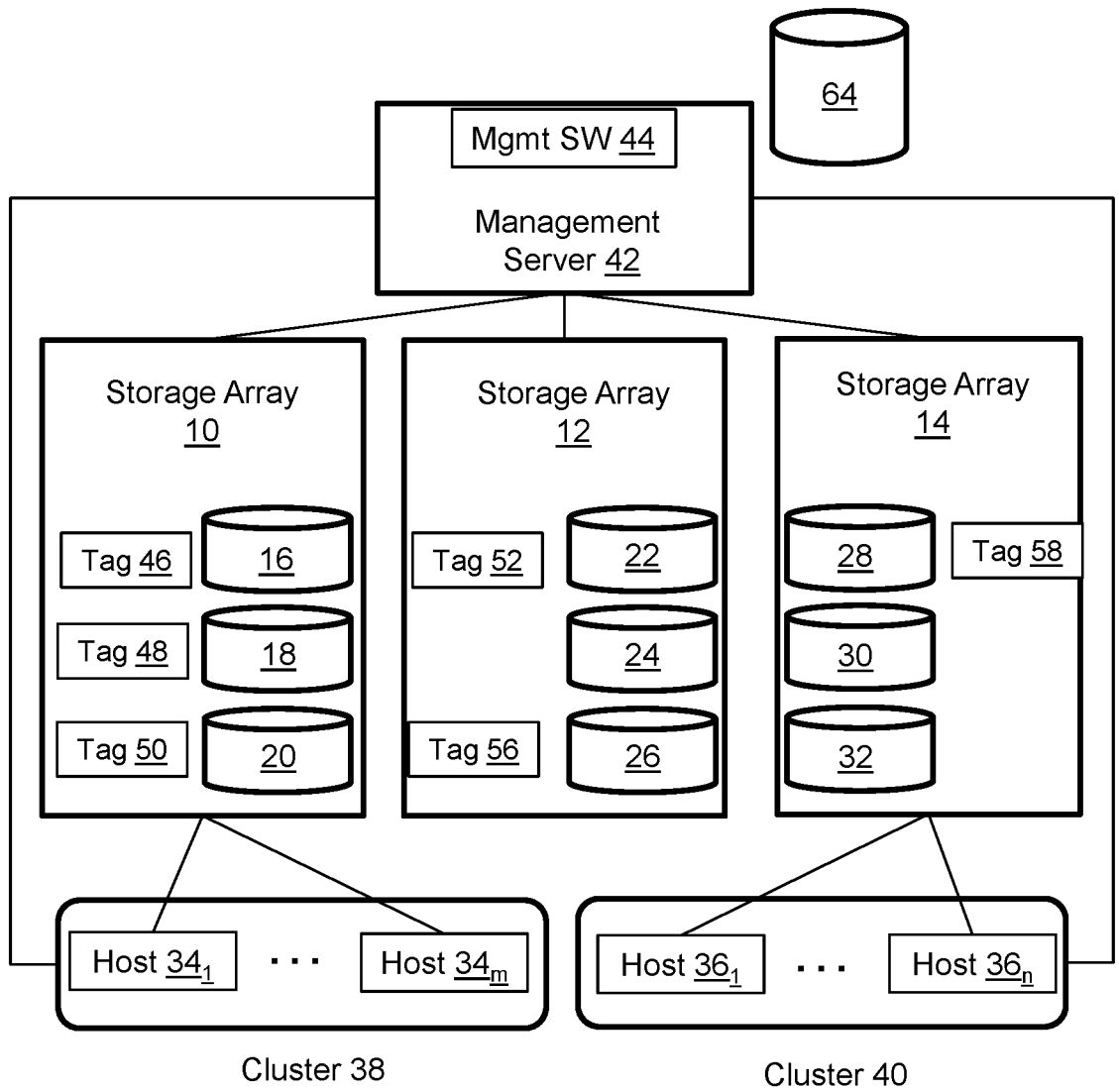
FIG. 1 illustrates a data center in which storage objects that satisfy predetermined characteristics indicative of importance of stored data are automatically identified and tagged with information to assist administration.

FIG. 1 illustrates a data center in which storage objects that satisfy predetermined importance characteristics are automatically identified and tagged with information to assist administration. In the illustrated example, which is presented for context and should not be viewed as limiting, storage arrays 16, 18, 20 maintain production storage objects 16, 18, 20, 22, 24, 26, 28, 30, 32 for host application instances running on hosts $34_1$-$34_m$, $36_1$-$36_n$ in clusters 38, 40. Individual production storage objects are not used by different host applications and a single host application may use a plurality of production storage objects. A management server 42, on which management software 44 runs, communicates with the host servers and the storage arrays to map host applications and data structures in the host application data to the production storage objects. Storage objects that satisfy predetermined importance characteristics are automatically identified and tagged. For example, tag 46 is associated with storage object 16, tag 48 is associated with storage object 18, tag 50 is associated with storage object 20, tag 52 is associated with storage object 22, tag 56 is associated with storage object 26, and tag 58 is associated with storage object 28. Storage objects 24, 30, 32 are not tagged. The tags may be stored in a database 64 maintained by the management server 42.

The host servers $34_1$-$34_m$, $36_1$-$36_n$ are tangible server computers with volatile memory, persistent storage, and multi-core processors. The host servers may implement virtual machines or containers and simultaneously support multiple instances of one or more host applications. The management server 42 is a tangible computing device that runs storage system management software that is stored on non-transitory memory and runs on a tangible processor. An example of storage management software is Dell Unisphere.

Figure 2:
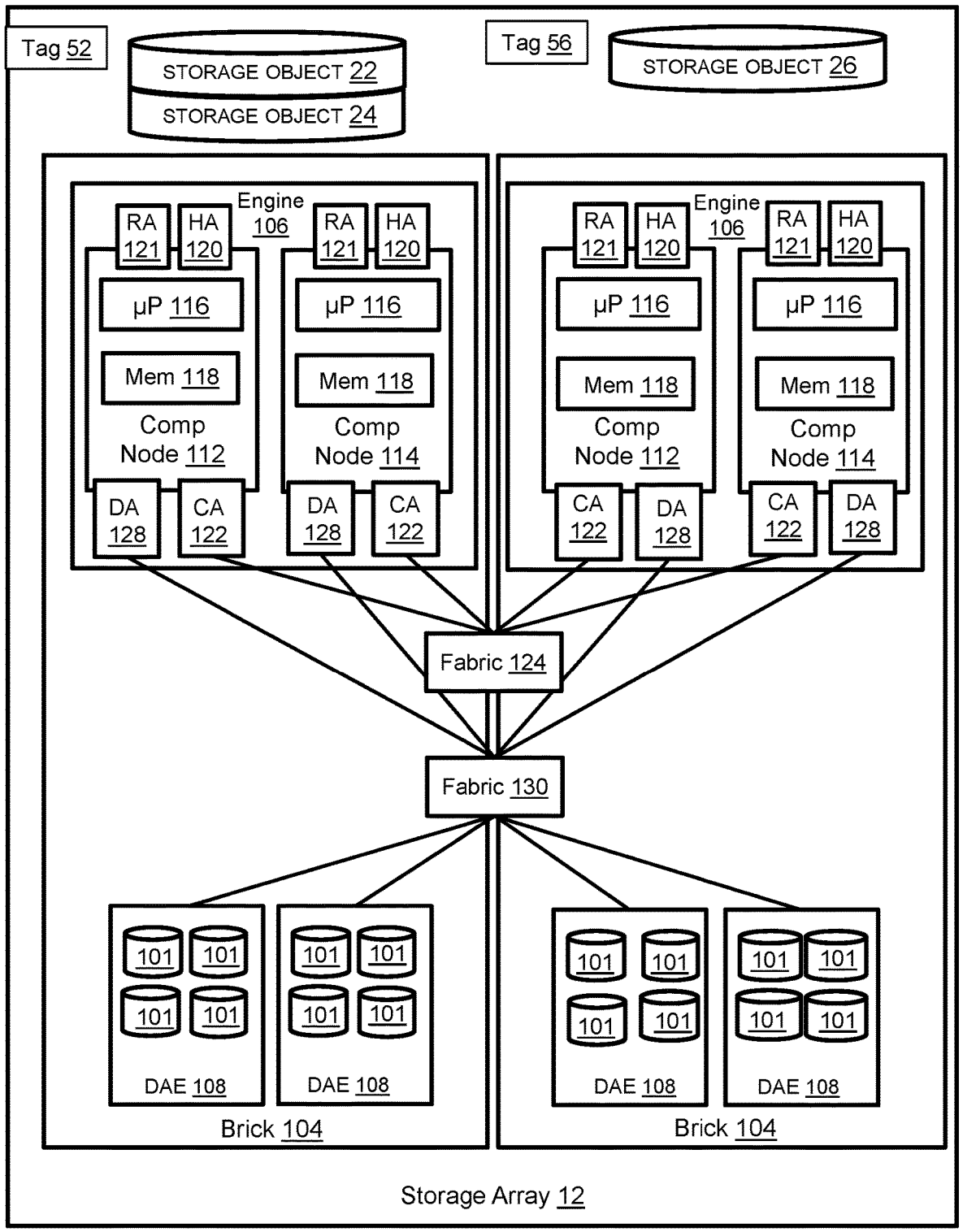
FIG. 2 illustrates a storage array with tagged storage objects in greater detail.

FIG. 2 illustrates storage array 12. The storage array includes one or more bricks 104. Each brick includes an engine 106 and one or more disk array enclosures (DAEs) 108. Each engine 106 includes a pair of interconnected compute nodes 112, 114 in a failover relationship with mirrored memory. The compute nodes may be referred to as "storage directors." Although it is known in the art to refer to the compute nodes of a SAN as "hosts," that naming convention is avoided in this disclosure to help distinguish the host servers from the compute nodes 112, 114. Each compute node 112, 114 includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by any compute node within the storage array using direct memory access (DMA). Each compute node includes one or more host adapters (HAs) 120 for communicating with the host servers. Each host adapter has resources for servicing input-output commands (IOs) from the host servers. The host adapter resources may include processors, volatile memory, and ports via which the host servers may access the storage array. Each compute node also includes a remote adapter (RA) 121 for communicating with other storage systems. Each compute node also includes one or more disk adapters (DAs) 128 for communicating with managed disks 101 in the DAEs 108. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on electrically erasable programmable read-only memory (EEPROM) technology such as NAND and NOR flash memory and hard disk drives (HDDs) with spinning disk magnetic storage media. For purposes of explanation, the managed disks described hereafter are same-size SSDs. Disk controllers may be associated with the managed disks as is known in the art. An interconnecting fabric 130 enables implementation of an N-way active-active backend. A backend connection group includes all disk adapters that can access the same disk or disks. In some implementations every disk adapter 128 in the storage array can reach every DAE via the fabric 130. Further, in some implementations every disk adapter in the storage array can access every managed disk 101.

The host application data that is created and used by the host application instances is maintained on the managed drives 101. The managed drives 101 are not discoverable by the host servers but the storage array creates storage objects 150, 151, 152, 153 that can be discovered and accessed by the host servers. Without limitation, a host-discoverable storage object may be referred to as a production volume, source device, production device, or production LUN, where the logical unit number (LUN) is a number used to identify logical storage volumes in accordance with the small computer system interface (SCSI) protocol. From the perspective of the host servers, a production storage object is a single disk having a set of contiguous fixed-size logical block addresses (LBAs) on which host application data resides. However, the host application data is stored at non-contiguous addresses on various managed drives 101. The compute nodes maintain metadata that maps between each production storage object and the managed drives 101 in order to process IOs from the host servers. A masking view limits storage object discovery and access such that only host servers that are authorized to access a production storage object can discover and access that production storage object.

Figure 3:
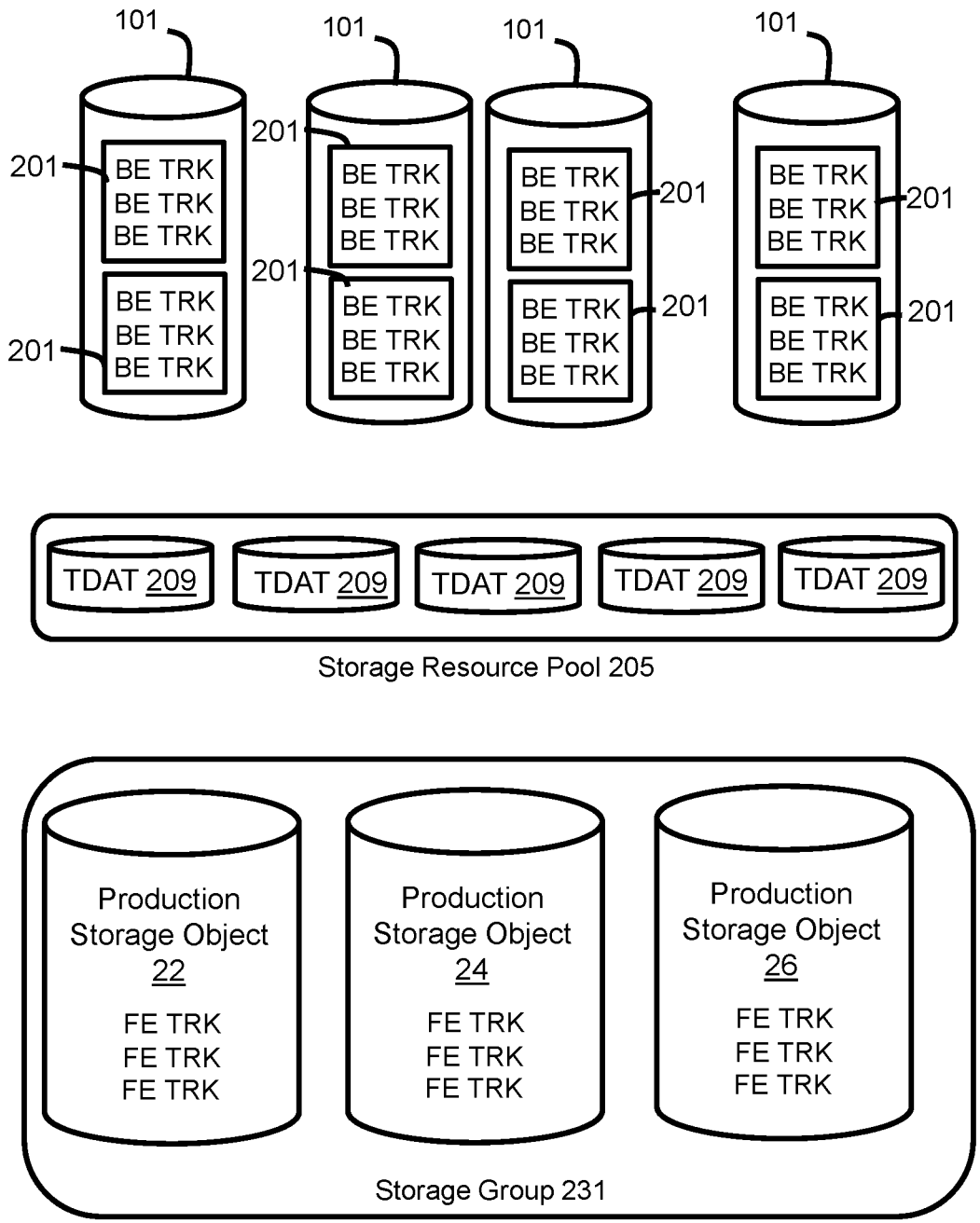
FIG. 3 illustrates layers of abstraction between the managed drives and the production storage objects.

Referring to FIG. 3, the storage array may maintain a variety of storage objects that are not discoverable by the host servers, e.g., storage objects at intermediate levels of abstraction between the managed drives 101 and production storage objects 22, 24, 26. Such storage objects are also created and managed with the storage management software. The basic allocation unit of storage capacity that is used by the compute nodes to access the managed drives 101 is a back-end track (BE TRK). The managed drives may be configured with subdivisions 201, each of which may contain multiple BE TRKs. Groupings of subdivisions from different managed drives are used to create RAID protection groups. A storage resource pool 205, also known as a thin pool, is a grouping of storage objects known as thin data devices (TDATs) 209 that contain RAID protection groups of the same type. Storage resource pools are used to create production storage objects 22, 24, 26, also known as thin devices (TDEVs). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory. A storage group 231 includes a group of production storage objects used by instances of only one host application. Storage objects that are not host-discoverable can be tagged.

FIG. 4 illustrates examples of tags. The illustrated example is a partial listing of storage objects that might be presented to an administrator by the storage management software. Each storage object is presented in a single row with indications of world-wide name (WWN), storage object type, capacity, utilization, status, and the tag (if any). The tag may include an identifier of the host application that uses the storage object. For example, the tag may include the name of the host application. The tag may also, or alternatively, include an identification of specific data structures within the host application data on that storage object that satisfy predetermined importance criteria. For example, a tag may indicate that the storage object includes an important Oracle database for Microsoft Exchange.

Figure 5:
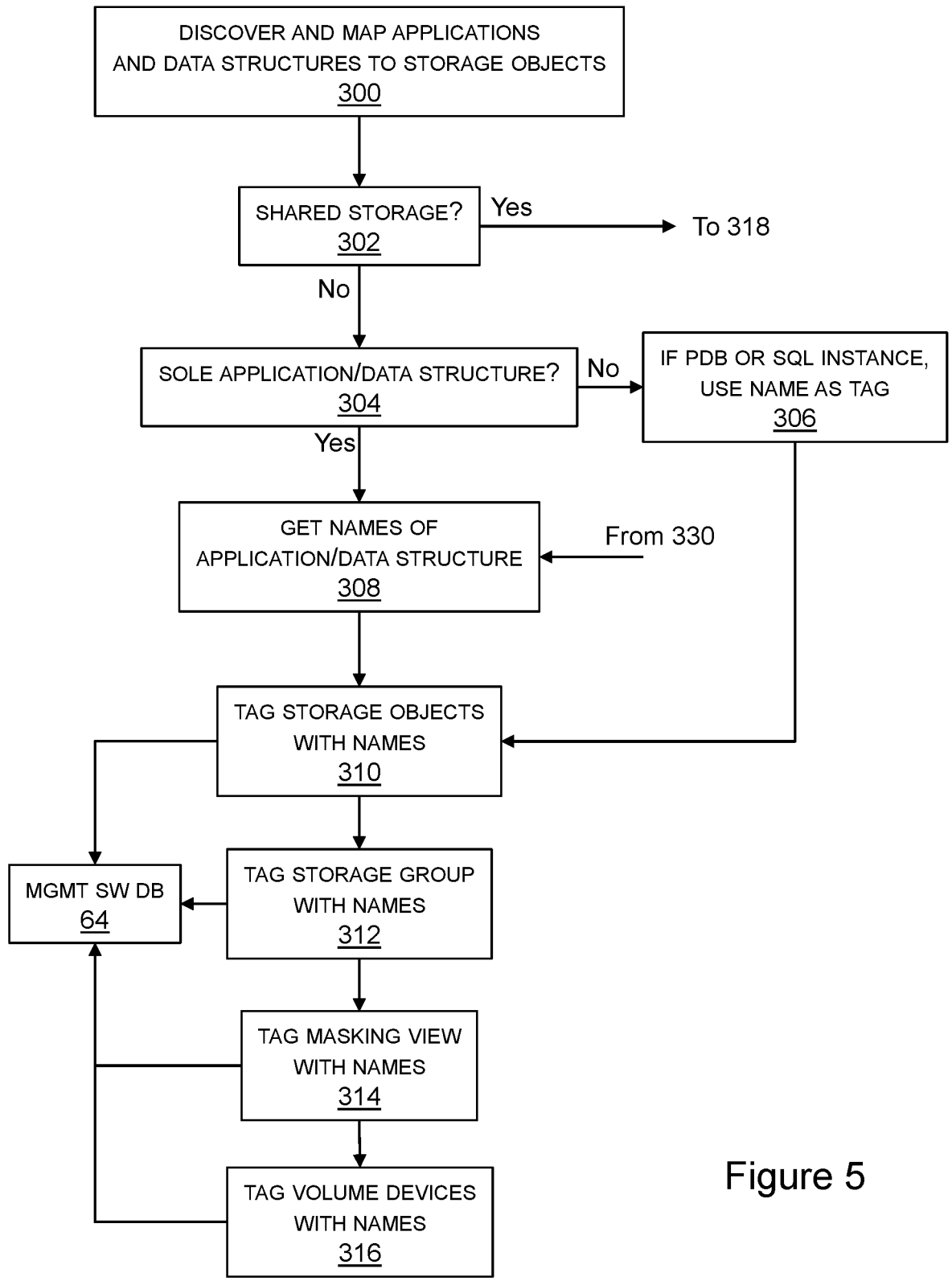
FIGS. 5 and 6 illustrate a process for identifying and tagging important storage objects.
Figure 6:
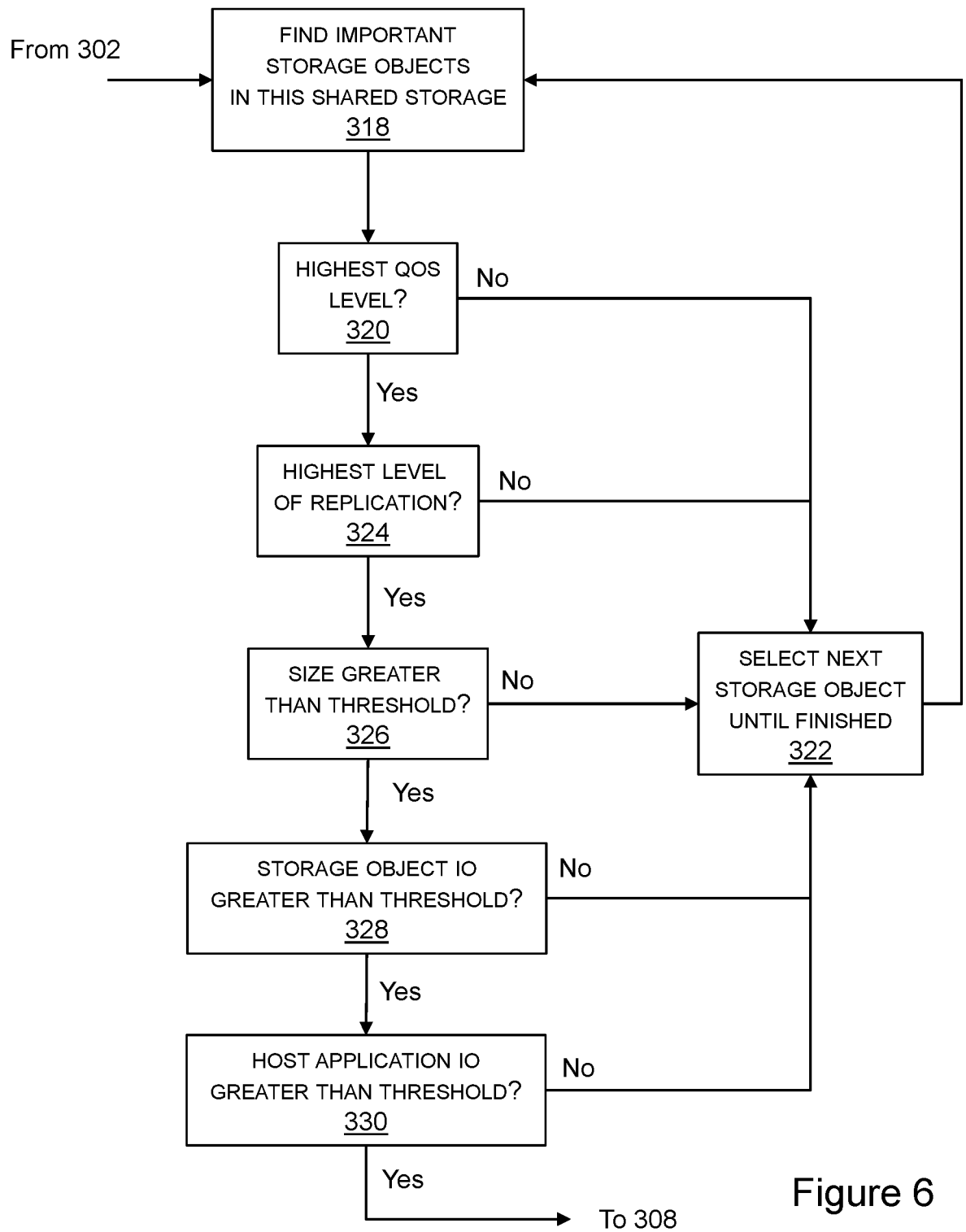

FIGS. 5 and 6 illustrate a process for identifying and tagging important storage objects. Host applications and data structures are mapped to storage objects in step 300. As mentioned above, this includes communications and information sharing between the storage management software, host servers, and storage arrays. Step 302 is determining whether the domain being analyzed is shared storage. Examples of storage domains may include, but are not limited to, a storage array or data center. Shared storage is storage that is used by more than one host application within the domain. If the storage is not shared, then step 304 is determining whether there is only a single data structure for a single host application. If there is only a single data structure for a single host application, then the names of the host application and data structure are obtained in step 308. Step 310 is tagging the storage objects with those names, e.g., by writing the tag to storage management software database 64. Step 312 is tagging the storage group that contains the storage objects with those names, e.g., by writing the tag to storage management software database 64. Step 314 is tagging the masking view associated with those storage objects with those names, e.g., by writing the tag to storage management software database 64. Step 316 is tagging the volume devices associated with those storage objects with those names, e.g., by writing the tag to storage management software database 64. If there is more than a single data structure for a single host application as determined in step 304, then the name is used as a tag if the data structure is a PDB or SQL instance as indicated in step 306.

If the domain being analyzed is shared storage as determined in step 302, then step 318 is beginning an iterative loop to find the important storage objects within that domain. All of the steps that test for importance may be implemented or a selected subset of steps may be implemented. Step 320 is determining whether a storage object selected for analysis is configured at the highest quality of service (QoS) level. The highest QoS level may be defined as the highest possible QoS level or the highest QoS level utilized within the domain under analysis. If the storage object is not configured at the highest QoS level, then the next storage object is selected as indicated in step 322. Step 324 is determining whether the storage object is configured for the highest level of replication. The highest level of replication may be defined as the highest possible replication level, or the highest replication level utilized within the domain under analysis and may be defined in terms such as frequency of snapshot generation. If the storage object is not configured to the highest level of replication, then the next storage object is selected as indicated in step 322. Step 326 is determining whether the storage object and/or a data structure therein has a size that is greater than a predetermined threshold. If the size is not greater than the predetermined threshold, then the next storage object is selected as indicated in step 322. Step 328 is determining whether IO loading on the storage object is greater than a predetermined threshold, e.g., in terms of TOPS. If the IO loading on the storage object is not greater than the predetermined threshold, then the next storage object is selected as indicated in step 322. Step 330 is determining whether the IO load generated by the host application is greater than a predetermined threshold. If the IO load generated by the host application is not greater than the predetermined threshold, then the next storage object is selected as indicated in step 322. If the IO load generated by the host application is greater than the predetermined threshold, then flow continues to step 308 and the application and data structure names are obtained, followed by tagging.

Advantages should not be considered as limitations to the inventive concepts, but at least some implementations enable the storage objects within a selectable storage domain to be automatically filtered in terms of importance. Further, the storage objects are automatically tagged with information such as the host application name and name of important data structures, if any, therein. Thus, administrators can quickly focus on the status of important data for purposes of management and troubleshooting.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
identifying storage objects within a storage domain;
automatically selecting all of the storage objects that satisfy a first set of predetermined importance characteristics comprising being located in non-shared storage and containing only a single data structure for a single host application;
automatically selecting all of the storage objects that satisfy a second set of predetermined importance characteristics comprising being located in shared storage and characterized by all of the following:
highest quality of service level;
highest level of replication;
size greater than a first threshold;
input-output loading greater than a second threshold; and
host application input-output load greater than a third threshold;
automatically tagging the selected storage objects;
presenting a listing of the tagged storage objects.

2. The method of claim 1 further comprising automatically tagging a first one of the selected storage objects with a name of a host application that uses data stored on the first storage object.

3. The method of claim 2 further comprising automatically tagging the first storage object with a name of a data structure stored on the first storage object.

4. An apparatus comprising:
a storage management computer configured to communicate with a storage node to:
identify storage objects within a storage domain;
automatically select all of the storage objects that satisfy a first set of predetermined importance characteristics comprising being located in non-shared storage and containing only a single data structure for a single host application;
automatically select all of the storage objects that satisfy a second set of predetermined importance characteristics comprising being located in shared storage and characterized by all of the following:
highest quality of service level;
highest level of replication;
size greater than a first threshold;
input-output loading greater than a second threshold; and
host application input-output load greater than a third threshold;
automatically tag the selected storage objects;
present a listing of the tagged storage objects.

5. The apparatus of claim 4 further comprising the storage management server configured to automatically tag a first one of the selected storage objects with a name of a host application that uses data stored on the first storage object.

6. The apparatus of claim 5 further comprising the storage management server configured to automatically tag the first storage object with a name of a data structure stored on the first storage object.

7. A non-transitory computer-readable storage medium storing instructions that when executed by one or more computers cause the computers to perform a method comprising:
identifying storage objects within a storage domain;
automatically selecting all of the storage objects that satisfy a first set of predetermined importance characteristics comprising being located in non-shared storage and containing only a single data structure for a single host application;

automatically selecting all of the storage objects that satisfy a second set of predetermined importance characteristics comprising being located in shared storage and characterized by all of the following:

highest quality of service level;

highest level of replication;

size greater than a first threshold;

input-output loading greater than a second threshold; and host application input-output load greater than a third threshold;

automatically tagging the selected storage objects;

presenting a listing of the tagged storage objects to an administrator.

8. The non-transitory computer-readable storage medium of claim 7 in which the method further comprises automatically tagging a first one of the selected storage objects with a name of a host application that uses data stored on the first storage object.

9. The non-transitory computer-readable storage medium of claim 8 in which the method further comprises automatically tagging the first storage object with a name of a data structure stored on the first storage object.

\* \* \* \* \*